(12) United States Patent
Ingram (10) Patent No.: US 11,669,436 B2
(45) Date of Patent: Jun. 6, 2023

(54) SYSTEM FOR PROVIDING INTERACTIVE TOOLS FOR DESIGN, TESTING, AND IMPLEMENTATION OF SYSTEM ARCHITECTURE

(71) Applicant: BANK OF AMERICA CORPORATION, Charlotte, NC (US)

(72) Inventor: Brandon Ingram, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/140,751

(22) Filed: Jan. 4, 2021

(65) Prior Publication Data

US 2022/0214962 A1 Jul. 7, 2022

(51) Int. Cl.
*G06F 11/36* (2006.01)
*H04L 67/141* (2022.01)
*G06F 3/0482* (2013.01)

(52) U.S. Cl.
CPC ........ *G06F 11/3664* (2013.01); *G06F 3/0482* (2013.01); *G06F 11/3608* (2013.01); *H04L 67/141* (2013.01)

(58) Field of Classification Search
CPC ............. G06F 11/3608; G06F 11/3664; G06F 3/0482; H04L 67/141
See application file for complete search history.

(56) References Cited

U.S. PATENT DOCUMENTS

| | | |
|---|---|---|
| 8,914,900 B2 | 12/2014 | Smith et al. |
| 8,930,917 B2 | 1/2015 | Mittal et al. |
| 9,003,231 B1 | 4/2015 | Graves |
| 9,141,517 B2 | 9/2015 | Hrastnik |
| 9,237,170 B2 | 1/2016 | Kiang et al. |
| 9,244,816 B2 | 1/2016 | Adamson |
| 9,430,361 B1 | 8/2016 | Masse et al. |
| 9,477,837 B1 | 10/2016 | Langton et al. |

(Continued)

OTHER PUBLICATIONS

Ling Hong Hung et al., "Building Containerized Workflows Using the BioDepot-Workflow-Builder," 2019 [retrieved on Feb. 12, 2022], Cell Systems vol. 9, Issue 5, pp. 508-514, downloaded from <url>:https://pdf.sciencedirectassets.com. (Year: 2019).*

(Continued)

*Primary Examiner* — S. Sough
*Assistant Examiner* — Stephen D Berman
(74) *Attorney, Agent, or Firm* — Moore & Van Allen PLLC; Nicholas C. Russell (57) ABSTRACT

A system provides for facilitating design, testing, and implementation of system architecture is provided. In particular, the system may be configured to determine that a user has accessed an interactive user interface via a user device, display one or more options associated with one or more applications associated with an entity on the interactive user interface, receive a selection of at least two options associated with at least two applications of the one or more applications, extract application data of the at least two applications in real-time, receive one or more connections associated with the at least two application from the user via the user device and the interactive user interface, and generate a flow by connecting the at least two applications based on the application data and the one or more connections received from the user.

14 Claims, 5 Drawing Sheets

(56) References Cited

U.S. PATENT DOCUMENTS

| | | |
|---|---|---|
| 9,712,624 B2 | 7/2017 | Lee |
| 10,097,565 B1 | 10/2018 | Masse et al. |
| 10,181,981 B2 | 1/2019 | Degioanni |
| 10,200,358 B2 | 2/2019 | Lander et al. |
| 10,523,514 B2 | 12/2019 | Lee |
| 10,606,986 B2 | 3/2020 | Maher et al. |
| 10,672,013 B2 | 6/2020 | Bs et al. |
| 10,762,471 B1* | 9/2020 | Wang .................. G06F 16/248 |
| 10,846,390 B2 | 11/2020 | Subramanian et al. |
| 10,872,032 B1 | 12/2020 | Russell |
| 2009/0070121 A1* | 3/2009 | Leonelli ............... G06Q 10/103 |
| | | 705/301 |
| 2012/0072367 A1* | 3/2012 | Reisbich ............. G06Q 10/067 |
| | | 715/764 |
| 2013/0055028 A1 | 2/2013 | Patil et al. |
| 2016/0274999 A1 | 9/2016 | Florez-Larrahondo |
| 2018/0089068 A1* | 3/2018 | Bhojan ............... G06F 11/3688 |
| 2021/0036968 A1 | 2/2021 | Reese |
| 2021/0173766 A1* | 6/2021 | Deb .................... G06F 11/3684 |

OTHER PUBLICATIONS

Paul Cleary et al., "Workspace: A workflow platform for supporting development and deployment of modelling and simulation," 2020 [retrieved on Feb. 12, 2022], Mathematics and Computers in Simulation, vol. 175, pp. 25-61, downloaded from <url>:https://pdf.sciencedirectassets.com. (Year: 2020).*

* cited by examiner

SYSTEM FOR PROVIDING INTERACTIVE TOOLS FOR DESIGN, TESTING, AND IMPLEMENTATION OF SYSTEM ARCHITECTURE

BACKGROUND

Conventional systems do not have the capability to test the architecture designs in real-time. As such, there exists a need for a system to facilitate design and testing of system architecture.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for facilitating design, testing, and implementation of system architecture. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention determines that a user has accessed an interactive user interface via a user device, displays one or more options associated with one or more applications associated with an entity on the interactive user interface, receives a selection of at least two options associated with at least two applications of the one or more applications, extracts application data of the at least two applications in real-time, receives one or more connections associated with the at least two application from the user via the user device and the interactive user interface, and generates a flow by connecting the at least two applications based on the application data and the one or more connections received from the user.

In some embodiments, the present invention generates the flow based on generating a logic to connect the at least two applications based on the application data and the one or more connections received from the user.

In some embodiments, the logic is a piece of software code.

In some embodiments, the present invention tests and validates the flow after connecting the at least two applications.

In some embodiments, the present invention determines that the test and validation of the flow is successful and implements the flow based on performing at least one of transmitting one or more notifications to one or more users, transmitting the application data associated with the at least two applications to an application tracking tool, and transmitting the application data associated with the at least two applications to an integration application.

In some embodiments, the present invention determines that the test and validation of the flow is not successful and displays one or more errors associated with unsuccessful testing and validation.

In some embodiments, the present invention extracts the application data from a centralized repository.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "entity" may be any organization that is associated with development, management, and/or testing of software applications. Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more resources provided by an entity or the system of the present invention. In a specific embodiment, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, design of system architecture involves one or more employees of an entity (e.g., architects, developers, or the like) drawing architecture designs over a period of time. However, such a process may be flawed or prone to errors and these errors do not come into light until implementation of the system architecture is fifty percent complete. Such a conventional process results in wastage of resources, memory, and the like, thereby causing re-development and re-implementation of the design after correcting the flaws in the design. As such, there exists a need for system that allows the one or more employees of the entity to design, testing, and implement system architecture in real-time.

The system of the present invention provides an interactive tool that allows the one or more users (e.g., architects, developers, or the like) of the entity to design, test, and implement one or more system architectures. The system allows the one or more users to extract application data associated with one or more applications of the entity in real-time and create one or more flows based on the real-time application data. The system also allows the one or more users to test and validate the one or more flows and provide the validated one or more flows to other users and/or system for implementation.

Figure 1:
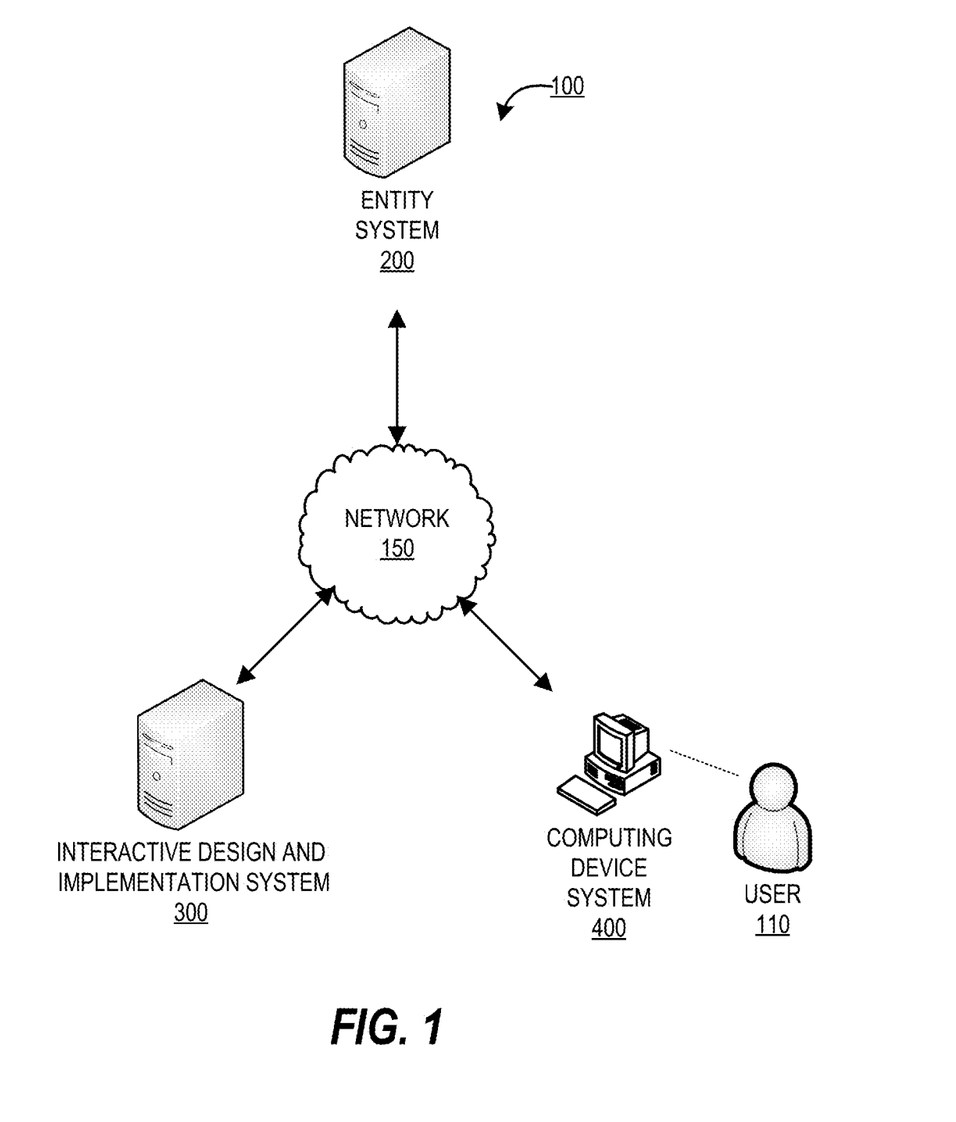
FIG. 1 provides a block diagram illustrating a system environment for facilitating design, testing, and implementation of system architecture, in accordance with an embodiment of the invention.

FIG. 1 provides a block diagram illustrating a system environment 100 for facilitating design, testing, and implementation of system architecture, in accordance with an embodiment of the invention. As illustrated in FIG. 1, the environment 100 includes an interactive design and implementation system 300, entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200. In some embodiments, the users may be architects that design system architecture, developers that develop one or more software applications associated with the entity of the entity system 200, or the like.

The entity system(s) 200 may be any system owned or otherwise controlled by an entity to support or perform one or more process steps described herein. In some embodiments, the entity is a financial institution. In some embodiments, the entity is a non-financial institution.

The interactive design and implementation system 300 is a system of the present invention for performing one or more process steps described herein. In some embodiments, the interactive design and implementation system 300 may be an independent system. In some embodiments, the interactive design and implementation system 300 may be a part of the entity system 200.

The interactive design and implementation system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the interactive design and implementation system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the interactive design and implementation system 300, and/or entity system 200 across the network 150.

Figure 2:
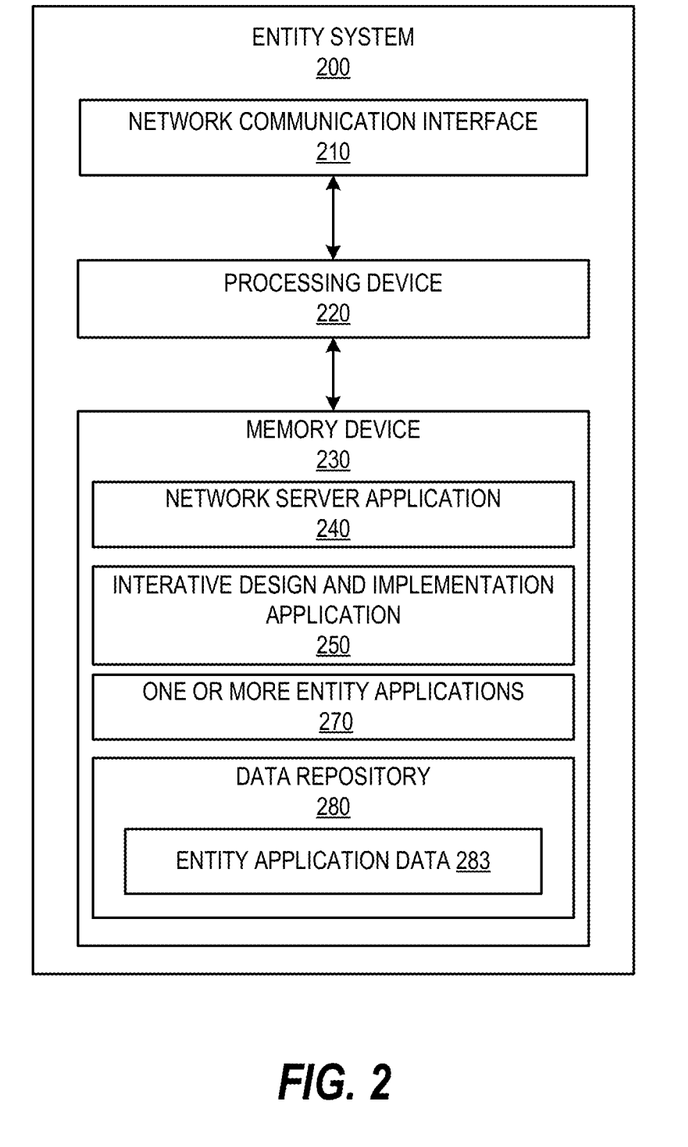
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution. In some embodiments, the entity system may be operated by any entity that is associated with developing, maintaining, and/or testing software applications that perform one or more operations of an entity.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an interactive design and implementation application 250, one or more entity applications 270, and a data repository 280 comprising application data 283, where the application data 283 comprises data associated with one or more entity applications 270 which includes, but is not limited to, software code, derived data, test data, metadata, or the like associated with the one or more entity applications 270. The one or more entity applications 270 may be any applications that are developed, maintained, tested, and/or utilized by the entity for performing one or more operations associated with the entity. The computer-executable program code of the network server application 240, the interactive design and implementation application 250, the one or more entity application 270 to perform certain logic, data-extraction, and data-storing functions of the entity system 200 described herein, as well as communication functions of the entity system 200. In some embodiments, the entity system 200 may comprise one or more different systems or servers that host each of the one or more entity applications 270 of the entity. In some embodiments, the entity system may further comprise application tracking tools, testing tools, or the like.

The network server application 240, the interactive design and implementation application 250, and the one or more entity applications 270 are configured to store data in the data repository 280 or to use the data stored in the data repository 280 when communicating through the network communication interface 210 with the interactive design and implementation system 300, and/or the computing device system 400 to perform one or more process steps described herein. In some embodiments, the entity system 200 may receive instructions from the interactive design and implementation system 300 via the interactive design and implementation application 250 to perform certain operations. The interactive design and implementation application 250 may be provided by the interactive design and implementation system 300. The one or more entity applications 270 may be any of the applications used, created, modified, and/or managed by the entity system 200 to perform one or more organizational activities.

Figure 3:
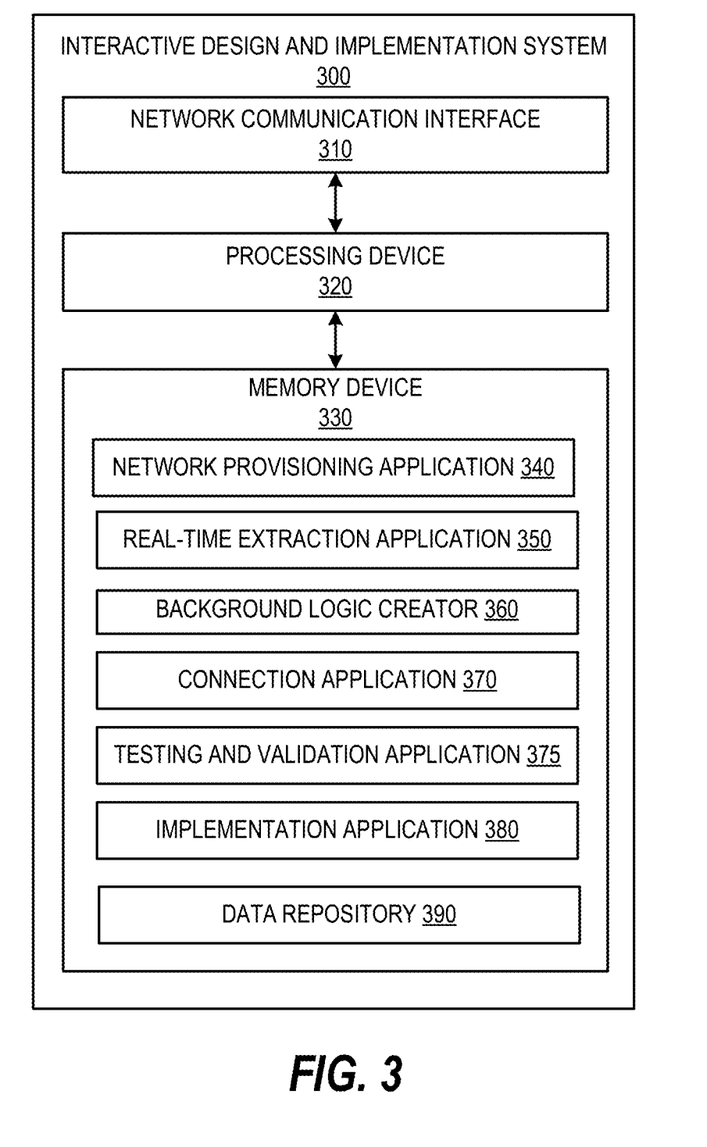
FIG. 3 provides a block diagram illustrating an interactive design and implementation system 300 of FIG. 1, in accordance with an embodiment of the invention.

FIG. 3 provides a block diagram illustrating the interactive design and implementation system 300 in greater detail, in accordance with embodiments of the invention. As illustrated in FIG. 3, in one embodiment of the invention, the interactive design and implementation system 300 includes one or more processing devices 320 operatively coupled to a network communication interface 310 and a memory device 330. In certain embodiments, the interactive design and implementation system 300 is operated by a first entity, such as a financial institution, while in other embodiments, the interactive design and implementation system 300 is operated by an entity other than a financial institution. In some embodiments, the interactive design and implementation system 300 is owned or operated by the entity of the entity system 200. In some embodiments, the interactive design and implementation system 300 may be an independent system. In alternate embodiments, the interactive design and implementation system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the interactive design and implementation system 300 described herein. For example, in one embodiment of the interactive design and implementation system 300, the memory device 330 includes, but is not limited to, a network provisioning application 340, a real-time extraction application 350, a background logic creator 360, a connection application 370, a testing and validation application 375, and an implementation application 380, and a data repository 390 comprising data processed or accessed by one or more applications in the memory device 330. The computer-executable program code of the network provisioning application 340, the real-time extraction application 350, the background logic creator 360, the connection application 370, the testing and validation application 375, and the implementation application 380 may instruct the processing device 320 to perform certain logic, data-processing, and data-storing functions of the interactive design and implementation system 300 described herein, as well as communication functions of the interactive design and implementation system 300.

The network provisioning application 340, the real-time extraction application 350, the background logic creator 360, the connection application 370, the testing and validation application 375, and the implementation application 380 are configured to invoke or use the data in the data repository 390 when communicating through the network communication interface 310 with the entity system 200, and/or the computing device system 400. In some embodiments, the network provisioning application 340, the real-time extraction application 350, the background logic creator 360, the connection application 370, the testing and validation application 375, and the implementation application 380 may store the data extracted or received from the entity system 200, and the computing device system 400 in the data repository 390. In some embodiments, the network provisioning application 340, the real-time extraction application 350, the background logic creator 360, the connection application 370, the testing and validation application 375, and the implementation application 380 may be a part of a single application. The functionalities of the network provisioning application 340, the real-time extraction application 350, the background logic creator 360, the connection application 370, the testing and validation application 375, and the implementation application 380 are explained in greater detail in FIG. 5.

Figure 4:
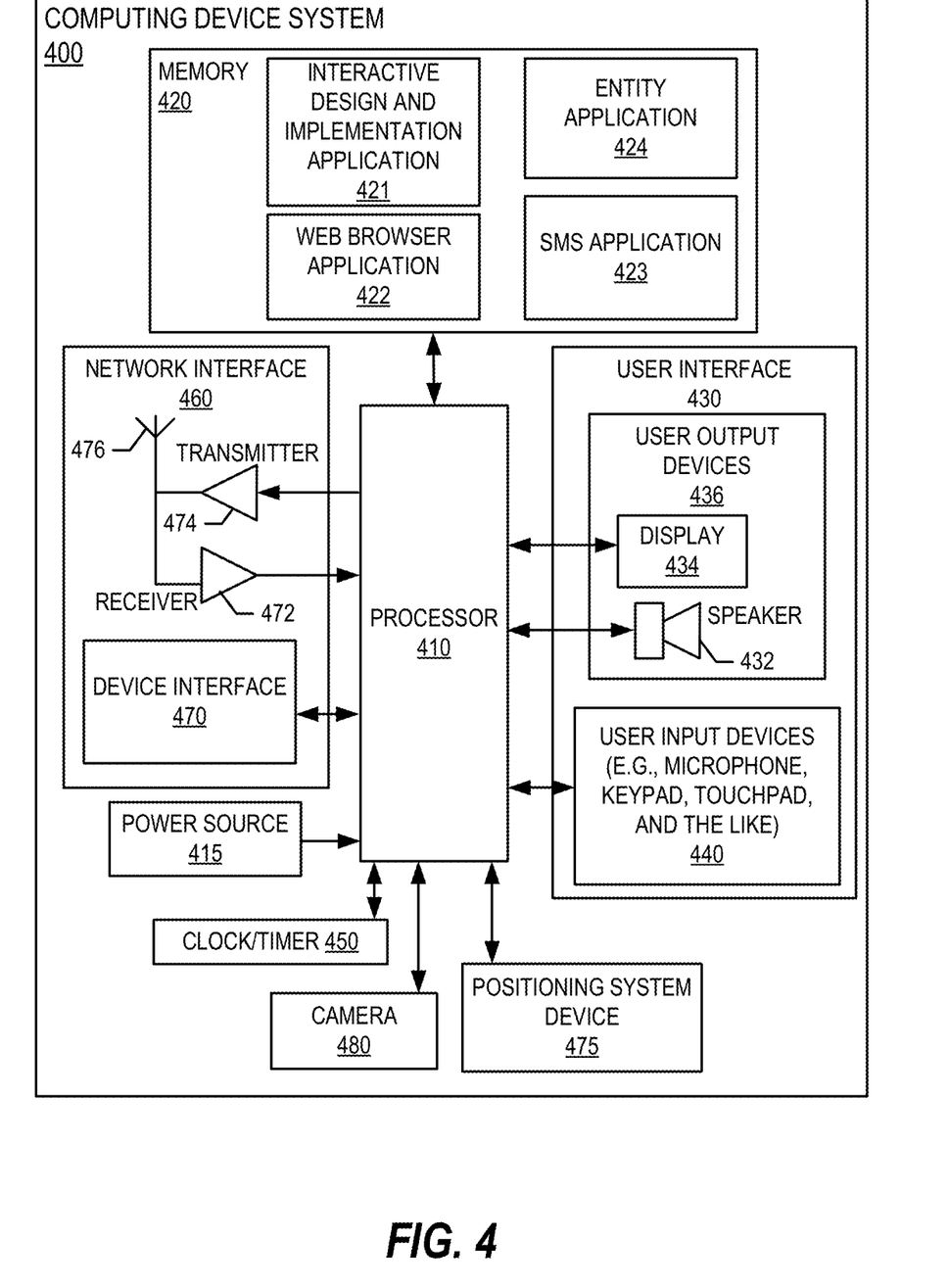
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an interactive design and implementation application 421, entity application 424, an SMS application 423, or the like. The interactive design and implementation application 421 may comprise instructions to a graphical user interface (GUI) on the display 430 that allows the user 110 to interact with the entity system 200, the interactive design and implementation system 300, and/or other devices or systems. The graphical user interface provided by the interactive design and implementation application 421 may be an interactive user interface that allows the user to perform one or more actions described in FIG. 5. The memory 420 of the computing device system 400 may comprise a Short Message Service (SMS) application 423 configured to send, receive, and store data, information, communications, alerts, and the like via the wireless telephone network 152. In some embodiments, the interactive design and implementation application 421 provided by the interactive design and implementation system 300 allows the user 110 to access the interactive design and implementation system 300. In some embodiments, the entity application 424 provided by the entity system 200 and the interactive design and implementation application 421 allow the user 110 to access the functionalities provided by the interactive design and implementation system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
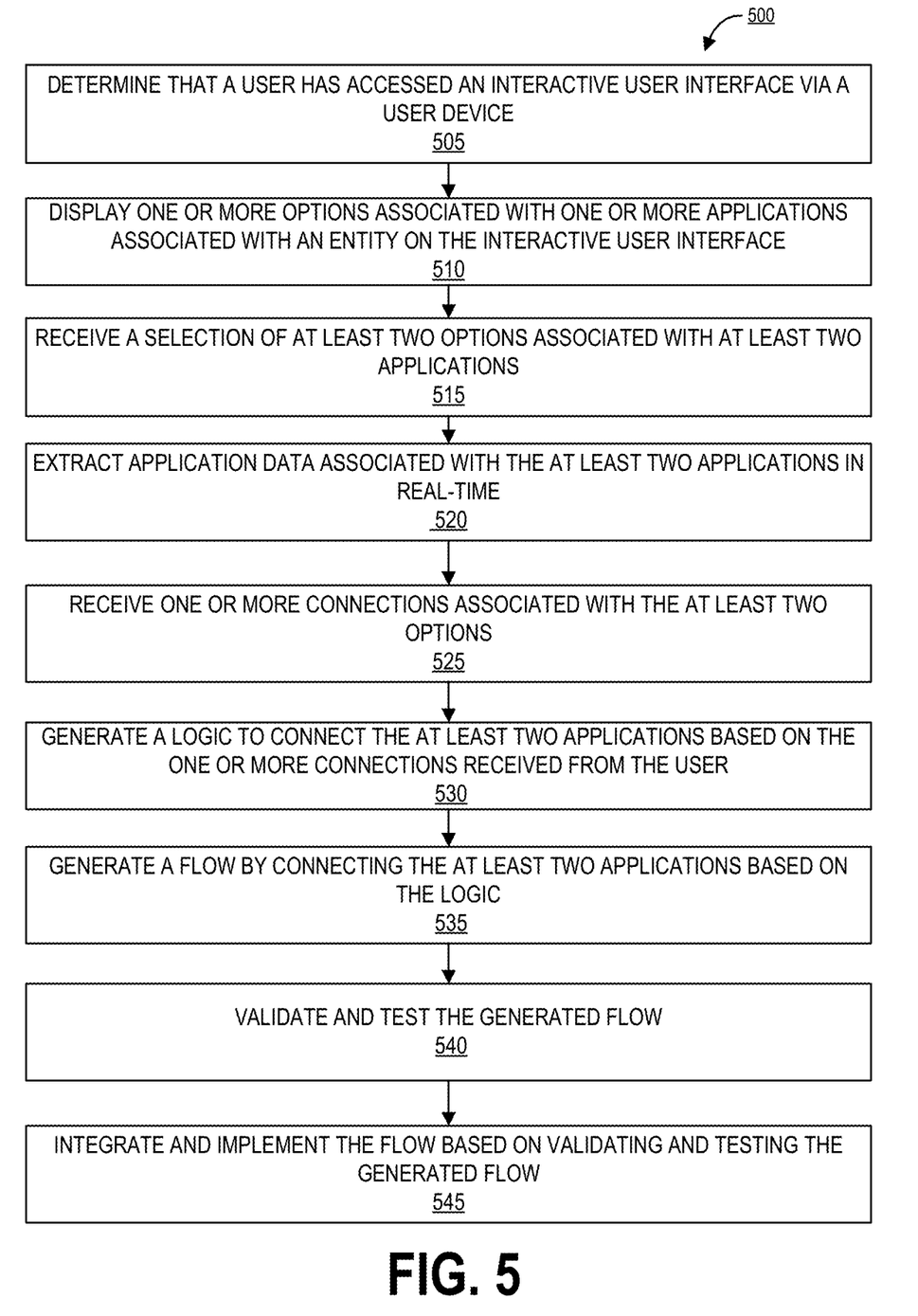
FIG. 5 provides a block diagram illustrating a process flow for facilitating design, testing, and implementation of system architecture, in accordance with an embodiment of the invention.

FIG. 5 provides a block diagram illustrating a process flow for facilitating design, testing, and implementation of system architecture, in accordance with an embodiment of the invention.

As shown in block 505, the system determines that a user has accessed an interactive user interface via a user device. The interactive user interface may be a graphical user interface provided by the system of the present invention. The interactive user interface provides one or more interactive features described in detail below. The system may determine that the user has accessed the interactive user interface after successful authentication of the user. The user may be an architect that develops architectural design solutions, a developer that develops one or more applications, or the like.

As shown in block 510, the system displays one or more options associated with one or more applications associated with an entity on the interactive user interface. In response to determining that the user is accessing the interactive user interface, the system displays one or more options associated with one or more applications. The one or more applications may be divided into groups and subgroups. The one or more options may be icons representing each of the one or more applications. The one or more applications may be any applications utilized, managed, maintained, developed, or the like by an entity to perform one or more organizational activities of the entity.

As shown in block 515, the system receives a selection of at least two options associated with at least two applications. In some embodiments, the system may prompt the user to select any of the one or more options. Receiving the selection of the at least two options may comprise a user dragging the options onto a blank area on the interactive user interface. In response to the user dragging the options, the system extracts application data associated with the at least two applications in real-time, as shown in block 520. The system may store the application data on the backend in a temporary storage and links the options with the extracted application data. The system may extract the application data from a centralized repository that stores updated application data of all one or more applications of the entity. The application data may comprise one or more software codes, test data, derived data, or the like associated with the one or more applications. In some embodiments, the centralized data may be maintained by the system of the present invention, where the system pulls application data associated with one or more applications from local server or repositories associated with the entity.

As shown in block 525, the system receives one or more connections associated with the at least two options. One or more connectors may be displayed by the system on the interactive user interface and the system allows the user to drag the one or more connectors to connect the at least two options (e.g., icons) associated with the at least two applications.

In response to receiving the one or more connections, the system generates a logic to connect the at least two applications based on the one or more connections received from the user, as shown in block 530. The logic generated by the system may be a piece of software code based on predefined standards stored in a database of the system. The predefined standards may be stored by a user (e.g., a developer). For example, if the user has connected application 'A' and application 'C,' the system generates software code that establishes a connection between the application 'A' and the application 'C.'

As shown in block 535, the system generates a flow by connecting the at least two applications based on the logic. In some embodiments, in response to generating the flow, the system may automatically transform the interactive user interface in real-time and may present an interactive motion on the interactive user interface that shows the successful connection between the at least two applications. As shown in block 540, the system validates and tests the generated flow in response to generating the flow. In some embodiments, the system may automatically perform the validation and testing of the flow. The system may run one or more predefined tests and predefined data validations to test the generated flow. In some embodiments, the system tests and validates the generated flow based on input received from the user. For example, the user may specify the type of tests and data validations. If the validation and testing of the flow is not successful, the system displays the errors and missing elements in the flow to the user via the interactive user interface.

As shown in block 545, the system integrates and implements the flow based on validating and testing the generated flow. If the validation and testing of the flow is successful, the system notifies one or more users, transmits the application data associated with the at least two applications to an application management tool, transmits the application data associated with the at least two applications to an integration application, and/or the like. In some embodiments, the integration application implements the flow after the development of new features that are based on the flow generated by the system. In some embodiments, the integration application may be a part of the system. In some embodiments, in response to validating and testing the flow, the system may transform the interactive user interface in real-time and display the successful validation and unsuccessful validation via interactive and/or non-interactive visual display elements on the interactive user interface. In some embodiments, the system may also display the missing features or errors via interactive and/or non-interactive visual display elements.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer-implemented method for facilitating design, testing, and implementation of system architecture, the method comprising:
    determining that a user has accessed an interactive user interface via a user device;
    displaying one or more options representing one or more software entity applications associated with an entity on the interactive user interface, wherein the one or more software entity applications are divided into groups and subgroups;
    receiving a selection of at least two options associated with at least two software entity applications of the one or more software entity applications;
    extracting software application data of the at least two software entity applications in real-time, wherein the software application data comprises one or more software codes, test data, and derived data;
    receiving one or more connections associated with the at least two software entity applications from the user via the user device and the interactive user interface;
    generating a logic to connect the at least two applications based on the software application data and the one or more connections received from the user;
    generating a software based flow by connecting the at least two software entity applications based on the software application data and the one or more connections received from the user;
    testing and validating the software based flow after connecting the at least two software entity applications;
    determining that the test and validation of the software based flow is not successful; and
    displaying errors and missing features in the software based flow that are associated with failure of the test and validation via interactive visual display elements and non-interactive visual display elements.

2. The computer-implemented method of claim 1, wherein the logic is a piece of software code.

3. The computer-implemented method of claim 1, wherein the method further comprises:
    determining that the testing and validating of the software based flow is successful; and
    implementing the software based flow based on performing at least one of transmitting one or more notifications to one or more users, transmitting the software application data associated with the at least two software entity applications to an application tracking tool, and transmitting the software application data associated with the at least two software entity applications to an integration application.

4. The computer-implemented method of claim 1, wherein the method comprises extracting the software application data from a centralized repository.

5. The computer-implemented method of claim 1, wherein the logic is generated based on predefined standards.

6. A system for facilitating design, testing, and implementation of system architecture, the system comprising:
a memory device with computer-readable program code stored thereon;
a communication device; and
a processing device operatively coupled to the memory device and the communication device, wherein the processing device is configured to execute the computer-readable program code to:
determine that a user has accessed an interactive user interface via a user device;
display one or more options representing one or more software entity applications associated with an entity on the interactive user interface, wherein the one or more software entity applications are divided into groups and subgroups;
receive a selection of at least two options associated with at least two software entity applications of the one or more software entity applications;
extract software application data of the at least two software entity applications in real-time, wherein the software application data comprises one or more software codes, test data, and derived data;
receive one or more connections associated with the at least two software entity applications from the user via the user device and the interactive user interface;
generate a logic to connect the at least two applications based on the software application data and the one or more connections received from the user;
generate a software based flow by connecting the at least two software entity applications based on the software application data and the one or more connections received from the user;
test and validate the software based flow after connecting the at least two software entity applications;
determine that the test and validation of the software based flow is not successful; and
display errors and missing features in the software based flow that are associated with failure of the test and validation via interactive visual display elements and non-interactive visual display elements.

7. The system according to claim 6, wherein the logic is a piece of software code.

8. The system according to claim 6, wherein the processing device is further configured to execute the computer-readable program code to:
determine that the test and validation of the software based flow is successful; and
implement the software based flow based on performing at least one of transmitting one or more notifications to one or more users, transmitting the software application data associated with the at least two applications to an application tracking tool, and transmitting the software application data associated with the at least two applications to an integration application.

9. The system according to claim 6, wherein the processing device is configured to extract the software application data from a centralized repository.

10. The system according to claim 6, wherein the logic is generated based on predefined standards.

11. A computer program product for facilitating design, testing, and implementation of system architecture, the computer program product comprising at least one non-transitory computer readable medium having computer-readable program code portions embodied therein, the computer-readable program code portions comprising executable portions performing operations, the operations comprising:
determining that a user has accessed an interactive user interface via a user device;
displaying one or more options representing one or more software entity applications associated with an entity on the interactive user interface, wherein the one or more software entity applications are divided into groups and subgroups;
receiving a selection of at least two options associated with at least two software entity applications of the one or more software entity applications;
extracting software application data of the at least two software entity applications in real-time, wherein the software application data comprises one or more software codes, test data, and derived data;
receiving one or more connections associated with the at least two software entity applications from the user via the user device and the interactive user interface;
generating a logic to connect the at least two applications based on the software application data and the one or more connections received from the user;
generating a software based flow by connecting the at least two software entity applications based on the software application data and the one or more connections received from the user, testing and validating the software based flow after connecting the at least two software entity applications;
determining that the test and validation of the software based flow is not successful; and
displaying errors and missing features in the software based flow that are associated with failure of the test and validation via interactive visual display elements and non-interactive visual display elements.

12. The computer program product of claim 11, wherein the logic is a piece of software code.

13. The computer program product of claim 11, wherein the operations further comprise:
determining that the test and validation of the software based flow is successful; and
implementing the software based flow based on performing at least one of transmitting one or more notifications to one or more users, transmitting the software application data associated with the at least two software entity applications to an application tracking tool, and transmitting the software application data associated with the at least two software entity applications to an integration application.

14. The computer program product of claim 11, wherein the logic is generated based on predefined standards.

* * * * *